United States Patent
Butler

(10) Patent No.: US 6,950,021 B2
(45) Date of Patent: Sep. 27, 2005

(54) ELECTRONIC WALL USING HIGH-RESOLUTION MILLIMETER-WAVE RADAR IN CONJUNCTION WITH MULTIPLE PLANE REFLECTORS AND RETROREFLECTORS

(76) Inventor: Walker Butler, 11837 N. Paradise Dr., Scottsdale, AZ (US) 85254

( * ) Notice: Subject to any disclaimer, the term of this patent is extended or adjusted under 35 U.S.C. 154(b) by 125 days.

(21) Appl. No.: 10/668,710

(22) Filed: Sep. 23, 2003

(65) Prior Publication Data

US 2005/0073411 A1 Apr. 7, 2005

(51) Int. Cl.$^7$ .............................................. G08B 13/08
(52) U.S. Cl. ..................... 340/545.3; 340/552; 340/564; 340/447; 340/446; 340/556; 342/5; 342/7; 342/28
(58) Field of Search ............................. 340/545.3, 552, 340/564, 447, 446, 556; 342/5, 7, 28

(56) References Cited

U.S. PATENT DOCUMENTS 6,664,918 B2 * 12/2003 Paradie et al. ................. 342/70
6,812,450 B2 * 11/2004 Hipp ............................ 250/221
6,859,164 B2 * 2/2005 Kurita et al. ................... 342/28

* cited by examiner

Primary Examiner—Tai Nguyen
(74) Attorney, Agent, or Firm—Don J. Carnegie

(57) ABSTRACT

An apparatus for detection of any intruder passing through an electronic wall is disclosed. The electronic wall is formed by a millimeter-wave radar positioned at one end of the wall and a plurality of combinations of plane reflectors and retroreflectors placed along the floor of the wall as well as on structures at both ends. The wall is formed of a plurality of electromagnetic beams with each beam having two segments, one between the radar antenna and a plane reflector and the second segment between the plane reflector and a retroreflector. A sufficient number of beams inhabit the wall volume to make traversing the wall by an intruder without detection essentially impossible, even though the intruder should attempt such detection avoiding methods as crawling under or jumping over the assumed locations of the beams. The primary means of determining that an intruder is traversing the wall is the detection of one or more electromagnetic beams being partially or completely blocked. A secondary means of detection is the radar reflection from the intruder's person that may be used to determine the location of an intruder along the extent of the wall.

9 Claims, 11 Drawing Sheets

ELECTRONIC WALL USING HIGH-RESOLUTION MILLIMETER-WAVE RADAR IN CONJUNCTION WITH MULTIPLE PLANE REFLECTORS AND RETROREFLECTORS

BACKGROUND OF THE INVENTION (1) Field of the Invention

The present invention relates in general to the field of intrusion detection, and in particular to detection by interruption of wave beams.

(2) Description of Related Art

A significant need exists to detect individuals who cross a boundary into an area that they are not allowed to enter. Nations have a great need to prevent the infiltration across their borders by agents of terrorist organizations or of other hostile nations. The need also exists to apprehend aliens who attempt to enter a nation to gain economic benefit without going through the lawful immigration process. The perimeters of many facilities, with examples being; military bases, military test ranges, penal institutions, and nuclear power plants, all must be monitored to assure that no individual enters or leaves the facility in other than an authorized manner. Both national borders and facility perimeters are often protected by such installations as woven wire fences or solid walls. However, a determined intruder can surmount or penetrate these structures, and thus additional detection measures are needed.

A desirable method of detecting the presence of an intruder is the establishment of an "electronic wall" that is formed by a multiplicity of volumes wherein any intruder entering one or more of these volumes will be detected. These volumes must have clearly defined limits to minimize false alarms from targets such as individuals or vehicles transiting near but not passing through the electronic wall.

An electronic wall can be used in conjunction with other barriers. For example; woven wire, or similar construction, fences can be positioned to one or both sides of and parallel to the electronic wall, to form a highly effective perimeter protection system for a facility or national border. The physical fence is typically fabricated of woven wire or similar material, and has sufficient height and wire gage that climbing over or cutting through the fence will require the expenditure of considerable time and effort. A preferred arrangement is the positioning of the electronic wall so that it must be penetrated before the intruder arrives at the physical fence. When the intruder passes through the electronic wall a detection message is immediately sent to the controlling authority, informing them that at a defined location a passage has occurred through the electronic wall. Interdiction personnel can be dispatched to the defined location to apprehend the intruder, often before the intruder can achieve penetration through the physical fence.

Prior art examples of electronic walls or fences for intruder detection have used micrometer, millimeter or infrared wavelengths in the electromagnetic spectrum. Various methods of generating single or multiple beams as well as methods of detection have been used.

Prior art infrared intrusion detectors use such methods as the formation of a beam or beams traversing the detection area with the breaking of a beam by the passage of an intruder initiating a detection, or collecting the reflection of the beam off the intruder by a receiver as a means of detection. Still another method comprises a passive system that detects the difference in temperature between the ambient environment and the intruder. The usefulness of the infrared class of prior art is limited by atmospheric conditions including heavy rain and fog that may interrupt the beams, and by the growing availability of infrared viewing equipment that may make infrared beams visible to a well equipped intruder.

Some examples of prior art that operate in the microwave and millimeter-wave spectrum are capable of generating confined beams to produce an electronic detection zone. Some place a transmitter at one end of the protected volume and a receiver at the other to form a beam or detection volume between the two. The patent, Blacksmith, et. al., U.S. Pat. No. 4,132,988, issued on Jan. 2, 1979, uses this configuration with a plurality of passive reflectors to surround a rectangular area and to place the receiver near the transmitter. The passive reflectors are used to change the direction of propagation of the beam, typically by 90 degrees, several times to surround the area to be protected and return the beam to the transmitter/receiver location. Interruption, or breaking, of the beam initiates an alarm. In this and similar systems a single beam is used with a cross section defined by the directivity of the antennas and the dimensions of the passive reflectors. An astute intruder could devise means to go under or over the beam and thus avoid detection.

Other prior art sensors based on radar concepts generate a single or multiple beams that are confined in azimuth and elevation, and seek to detect an intruder within one or more of the beams by ranging on the radar return from the intruder. These sensors require significantly greater emitted energy than beam breaker systems.

The patent, Bjornholt et. al., U.S. Pat. No. 6,466,157, issued on Oct. 15, 2002, generates an electronic fence using a high-resolution millimeter-wave radar in conjunction with multiple passive reflectors that reflect the millimeter-wave energy back toward the radar to produce a multiplicity of electromagnetic beams. A sensor structure is located at one end of the electronic fence volume while a reflector structure is positioned at the opposite end at a distance of some two or three hundred meters. The sensor structure includes a radar that is sequentially coupled to three radar antennas positioned various heights. One antenna produces a beam broad in elevation to detect the radar return from the person of any intruder infiltrating the volume of the fence in near proximity to the sensor structure. Multiple beams are formed between a second radar antenna and passive reflectors placed along the floor of the electronic fence in the mid-region. Additional multiple beams are formed between the third radar antenna and passive reflectors of two types located in the more distant portions of the electronic fence. The first type of passive reflector is identical to that used in the mid-region, while the second type comprises an antenna coupled to a length of waveguide that is shorted at its distal end. Millimeter-wave energy enters the antenna, travels down the waveguide, is reflected, and after returning through the waveguide is reradiated by the antenna. Each passive reflector of this second type has a unique length of waveguide to produce an apparent different radar range from the radar in the sensor structure. Each radar beam included in the electronic fence has a different apparent radar range; thus the radar signal processing circuitry is capable of determining which beam has been interrupted by an intruder and can estimate the location of the intrusion.

The prior art design of Bjornholt, et. al., exhibits several disadvantages. These include the use of three different radar antennas and the resulting necessity to couple the radar to these antennas sequentially one at a time. The radar signal processing circuitry must process the data from each antenna independently and then integrate the result into a single output. Another disadvantage is the amount of signal loss that occurs in the waveguides of the passive reflectors included in the reflector structure.

Most prior art electronic walls comprise an insufficient number of electromagnetic beams that cover only parts of the length and height of the wall, thereby allowing "holes" for intruders to pass through. In addition, the prior art intrusion detectors are complex in design, difficult to transport, consume a great amount of prime power, emit high levels of electromagnetic energy, have a low probability of detection of any intruder traversing the electronic wall, and have a high false alarm rate for any entity even near (but not passing through) the wall.

BRIEF SUMMARY OF THE INVENTION

The invention relates to an electronic wall that consists of multiple, two-segment millimeter-wave beams formed by a high-resolution radar in conjunction with combinations of plane reflectors and retroreflectors. The invention provides a new and improved method for the detection of any intruder attempting to traverse the volume defined as the electronic wall, and the apparatus for the implementation of this wall. One advantage of the present invention is that the multiplicity of beams are formed of energy in the millimeter-wave region of the spectrum where the energy can be confined to well defined beams by reasonably sized antennas and reflecting devices.

An advantage of the present invention is that the multiple beams have their origin and terminus at a single millimeter-wave radar antenna included in a sensor structure located at one end of the electronic wall. The combination of a plane reflector and a retroreflector is used in conjunction with the radar antenna to form each individual beam that is made up of two segments. Millimeter-wave energy proceeds from the radar antenna to a plane reflector that is positioned so that it redirects the energy toward a retroreflector. The energy is then returned by the retroreflector back along substantially the same path to the plane reflector and thus to the radar antenna thereby forming a beam. With plane reflectors and retroreflectors suitably located along the surface that forms the lower extent of the electronic wall, a continuous series of beam segments are formed that cannot be crawled under by any intruder.

A multiplicity of plane reflector and retroreflector combinations are appropriately located along the surface under the electronic wall. In that portion of the wall volume near the sensor structure, plane reflectors are located along the surface and their associated retroreflectors are positioned at intervals along the vertical dimension of the sensor structure. In a similar manner, at the distal end of the electronic wall, a multiplicity of plane reflectors are positioned at intervals along the vertical dimension of a reflector structure and their associated retroreflectors are placed at selected positions along the surface near the reflector structure. An advantage of the use of the two-segment beam arrangement is that combinations of plane reflectors and retroreflectors can be positioned to direct segments of beams into any depressions or other irregularities existent in the surface under the electronic wall.

Another advantage of the invention is that the high reflectivity of the plane reflectors and retroreflectors result in a high signal to noise ratio of the signal returned to the radar antenna; thus false alarms are greatly diminished. An added advantage is that the plane reflectors and retroreflectors are positioned in such a manner that the distance from the radar antenna to a plane reflector added to the distance between the plane reflector and the retroreflector results in each beam thus formed having a unique radar range. Receiving apparatus included in the radar is capable of independently assessing the amplitude of the returned signal from each beam with a unique radar range. An additional advantage of the invention is that the continuity of each individual beam is monitored at a sufficiently high rate that an intruder cannot traverse any beam or beams without being detected by beam interruption. Any reduction in a beam's amplitude due to an intruder partially or completely blocking the beam results in the generation of an intrusion alarm.

Still another advantage of the invention is that the breaking of one or more millimeter-wave beams constitutes the primary means of detection of intruders. However, the radar reflections from the person of most intruders are detected and used to report the distance from the sensor structure to the intruder location. A further advantage of the invention is that a sufficient number of beams inhabit the wall volume between the sensor end and the terminus end to make traversing the wall by an intruder without detection through this volume essentially impossible. This is true even if the intruder might attempt such detection avoiding methods as crawling under or jumping over the assumed locations of the beams.

An additional advantage of the present invention is that each plane reflector and retroreflector used to form the electronic wall is coupled to an adjustment and support mechanism. This mechanism allows for ease of alignment of the two segments of each beam, and the maintenance of that alignment during operation. Other advantages of the present invention are that all energy consuming elements are included within the sensor structure housing, power consumption is minimal due to beam formation by highly efficient reflectors, and all components are easily transportable and deployed. Still other aspects, embodiment, and advantages of the invention will become apparent by reading the detailed description that follows, and by referencing the accompanying drawings.

BRIEF DESCRIPTION OF DRAWINGS

It is to be understood that the drawings are to be used for the purposes of exemplary illustration only and not as a definition of the limits of the invention. None of the figures are drawn to scale. Referring to the drawings in which like reference numbers present corresponding parts throughout.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be used, and logical, mechanical, and other changes may be made without departing from the spirit or scope of the present invention. The following detailed description is, therefore, not to be taken in a limiting sense, and the scope of the present invention is defined only by the appended claims.

Figure 1:
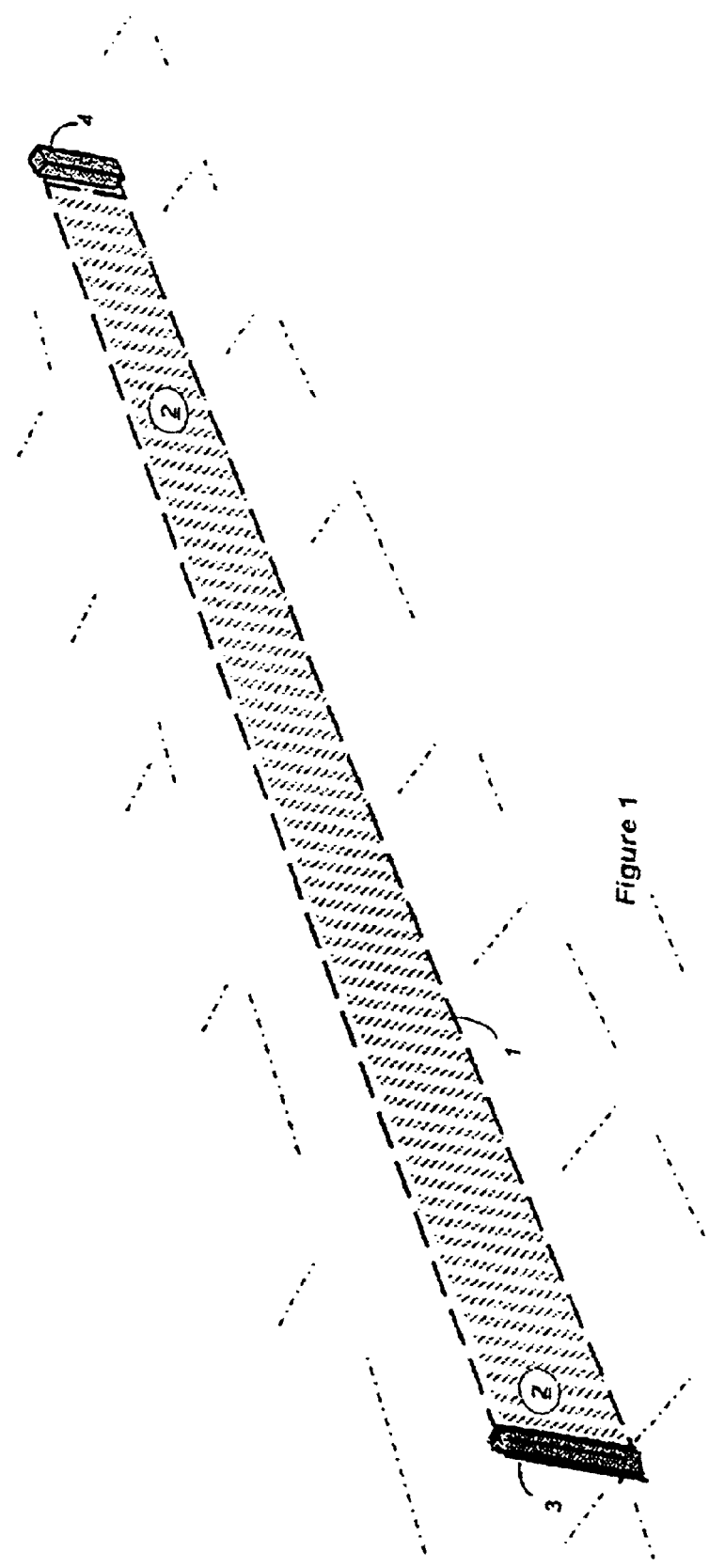
FIG. 1 is an exemplary illustration of an electronic wall in accordance with the present invention, providing complete coverage from the surface up to a selected height and along the entire length between a sensor structure and a reflector structure at its terminating ends.

FIG. 1 is an exemplary depiction of an electronic wall that includes a sensor structure, reflector structure and the volume between these structures in one embodiment of the invention. As shown, the invention provides complete coverage from the surface 1 under the electronic wall 2 up to a selected height and along the entire length of the electronic wall. A sensor structure 3 is shown to the left at one end of the electronic wall 2. The fence is terminated by a reflector structure 4 to the right.

The length of the electronic wall defined by the present invention may be as little as a few tens of meters. The maximum length of the electronic wall 2 is limited only by several factors including minimum radar antenna azimuthal beamwidth with its effect upon the amount of electromagnetic energy arriving at the distant plane reflectors and retroreflectors, and the difficulty of properly aligning the plane reflectors and retroreflectors located at significant distances from the sensor structure. A typical, but not limiting, maximum length of the electronic wall of the present invention is approximately 500 meters.

The vertical extent of the electronic wall 2 of the present invention should be sufficiently high that a human intruder cannot traverse over the top of the wall without significant mechanical assistance. The vast majority of the human population would find it impossible to jump unaided over a barrier of 2.5 or more meters in height. The horizontal extent of the electronic wall 2 is defined by the width of the electromagnetic beams of which it is formed, the beam dimensions are primarily defined by the size of the retroreflectors used to produce the beams.

One exemplary embodiment of the present invention includes an electronic wall 2 that can be defined as having a length, for example, of about 300 meters and a height of about three meters. The retroreflectors used in this exemplary embodiment result in a thickness of the electronic wall of less than approximately a half meter.

The electronic wall 2 is formed by a plurality of electromagnetic beams with each beam emanating from the sensor structure 3, proceeding to a plane reflector that redirects the beam toward a retroreflector where the beam is returned by way of the plane reflector along its original path to the sensor structure. Any location along the wall can be defined by its distance in meters from the sensor structure. Complete or partial interruption of any one or more of the electromagnetic beams that comprise the electronic wall 2 results in an intrusion alarm being generated. In addition, intruders attempting to traverse the wall may also be detected by the radar return from their person and any equipment that they may be carrying. This type of return is often referred to as a skin return by those of skill in the art.

The sensor structure 3 includes a pillar-like housing coupled to a base sufficient to maintain the housing in a vertical position with substantially no movement due to wind or other normally encountered environmental conditions. An alternate installation comprises the coupling of the housing either permanently or temporarily to the side of a building, utility pole, or other available structure. A radar antenna, from which the multiple electromagnetic beams emanate, is coupled to the sensor structure 3 in a manner that places the center of the antenna aperture at a height equal to the upper most beam that forms the electronic wall 2. The height of the sensor structure housing exceeds the height of the electronic wall by an amount sufficient to enclose the radar antenna.

The sensor structure 3 includes a radar sensor that may comprise a frequency modulated continuous wave (FM-CW) radar operating in the millimeter-wave spectrum. The radar apparatus also includes signal-processing circuitry to process the received signal data and thus monitor the amplitudes of each of the multiple beams formed by a plane reflector and retroreflector combination. Each beam is recognizable by a unique radar range that is the result of the placements of the plane reflector and retroreflector with respect to the sensor structure 3. The signal processing circuitry may also detect the presence of skin returns from any intruders. The radar apparatus further includes decision logic to determine when an intrusion is occurring, and equipment to relay detection data to an operator, either present or at a remote location. Also included are power sources to supply the energy needs of the equipment.

Figure 2:
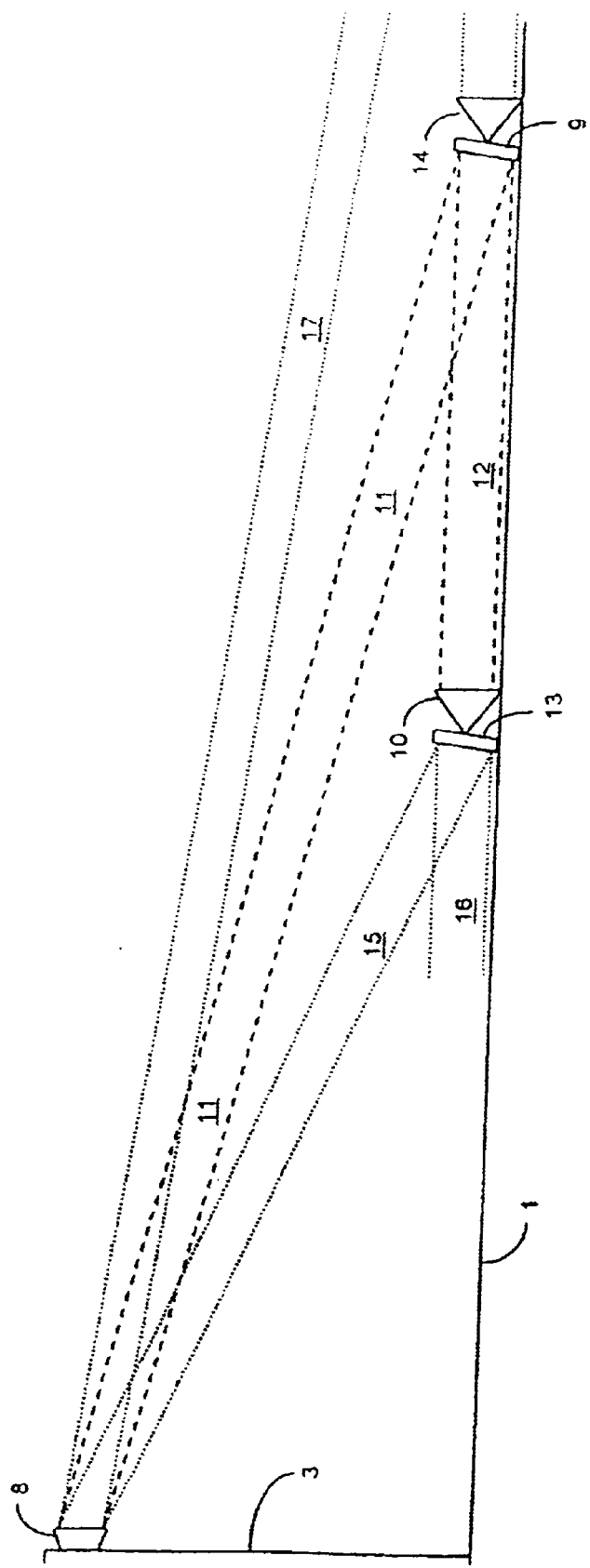
FIG. 2 is an exemplary depiction of beams that are each formed by electromagnetic energy proceeding from a radar antenna to a plane reflector, being reflected toward a retroreflector, and then being returned along the same, two-segment path to the radar antenna, in accordance with the present invention.

FIG. 2 is an exemplary depiction of the formation of an electromagnetic beam by a combination of the radar antenna 8, a plane reflector 9, and a retroreflector 10. The plane reflector 9 and retroreflector 10 are positioned along the line, on the surface 1 under the electronic wall 2, that extends from sensor structure 3 to the reflector structure 4. Plane reflector—retroreflector combinations plus the radar antenna form every beam included in the electronic wall.

The radar antenna 8, shown mounted near the top of the sensor structure 3, preferably produces a beam that has a narrow beamwidth in azimuth and an elevation beamwidth that extends from the closest plane reflector 13 to the plane reflector coupled to the top of the reflector structure 4. This combination of beamwidths concentrates the greatest amount of emitted energy toward the multiple plane reflectors located along the surface under the electronic wall and those coupled to the reflector structure. Depending upon the height of the electronic wall and the distance of the closest plane reflector the preferred elevation beamwidth of the antenna, may for example, be approximately 20 degrees. For optimum concentration of the emitted energy on the multiple plane reflectors, the antenna beamwidth should be less than one degree in azimuth. However, concerns for reasonable physical size, complexity and cost may influence the selection of an antenna that has a beamwidth of, for example, approximately two degrees in azimuth. These beam dimensions are determined by the well known process of measuring the plotted beamwidth at points that are approximately −3 dB from the peak amplitude. The boresight of the radar antenna is directed toward the reflector structure 4, and is depressed sufficiently to direct millimeter-wave energy toward plane reflectors located along the surface under the electronic wall, as well as those mounted on the reflector structure.

The surface of the plane reflector 9 that faces the radar antenna 8 is fabricated of polished Aluminum or similar material that is highly reflective of millimeter-wave energy. The surface finish and flatness are several orders of magnitude less than the wavelength of the reflected millimeter waves. Therefore; the level of millimeter-wave energy in the beam leaving the plane reflector is substantially the same as that of the energy arriving at its surface; and the spreading of the energy after reflection is essentially the same as that of the impinging energy. The plane reflector is coupled to a support structure that includes provisions for ease of installation, adjustment of the reflector in both azimuth and elevation, and maintenance of the reflector rigidly in position after adjustment. The portion of the millimeter-wave energy emanating from the radar antenna 8 that arrives at the plane reflector 9 is redirected in accordance with well known laws of reflection from a flat reflective surface. The plane reflector support structure is adjusted to direct the reflected energy toward the retroreflector 10.

The retroreflector 10 has a structure known as a corner reflector to those of skill in the art. This type of retroreflector comprises a three sided pyramid made up of three highly reflecting surfaces, each having the shape of an equilateral right triangle. The pyramid base is open and positioned to face the plane reflector 9. Millimeter-wave energy entering the pyramidal structure is reflected by a surface across the structure to one or both of the other surfaces and then back out of the structure in such a manner that the outgoing energy proceeds parallel to, but in the opposite direction of the incoming energy. The beam thus formed exhibits a hexagonal cross section.

The retroreflector is usually characterized by the internal edge length from any of the three corners of the pyramid base to its peak. The distances from each corner to the peak are the same. Those of skill in the art will recognize several relationships characteristic of the retroreflector. Given that: A equals the internal edge length of the pyramid, B equals a side of the equilateral triangle forming the pyramid base, C equals the height (from one side to the opposite side) of the hexagonal shaped beam formed by the retroreflector, $\sigma$ equals its radar cross section, and $\lambda$ is the wavelength of operation.

Then:

$$B = 1.41 \times A$$

$$C = 0.82 \times A$$

$$\sigma = \frac{4 \times \pi A^4}{3 \times \lambda^2}$$

Retroreflectors can be fabricated in any of a number of sizes. For example, a retroreflector of preferred size for use in the present invention may have a value for the dimension A of 0.185 meters (18.5 centimeters). The relationships above reveal that this retroreflector will produce a beam having a vertical dimension of approximately 0.15 meters, and will have a radar cross section of some 69 square meters, assuming that the radar operates at a frequency of 35.5 Gigahertz.

Other values for the dimension A can be chosen, with the resulting retroreflector producing different values for the beam height C and the radar cross section. If a smaller sized retroreflector is chosen, the result will be a beam having less height. The spacing between beams must remain at a constant value to prevent an intruder from passing between the beams; thus, if beams having less height are used, the retroreflector-to-retroreflector spacing must decrease and more beams will be required.

The retroreflector defines the vertical and horizontal extent of the hexagonal beam segment 12. The geometry of a hexagon indicates that the horizontal dimension is at most 1.14 times greater than the vertical dimension of the beam. Thus, the aforementioned retroreflector with an internal edge length A of 0.185 meters, will produce a beam segment 12 having a vertical dimension of approximately 0.15 meters and a horizontal dimension of some 0.17 meters. The vertical dimension of the beam segment 11, in FIG. 2, is defined by the retroreflector at locations near the plane reflector 9 and is determined by the characteristics of the radar antenna 8 at locations near this device.

The dimensions of the plane reflector 9 must be sufficiently greater than the dimensions of the hexagonal beam 12 emanating from the retroreflector 10 so that this reflector does not limit the extent of either beam segment 11 or 12. A conservative design choice is to select dimensions for the plane reflector about one-third greater than the dimensions of the hexagonal beam. For the example hexagonal beam 12 defined above, the result is a plane reflector having approximate dimensions of 0.2 meters in height and 0.23 meters in width. If another size is chosen for the retroreflectors, then the resulting beams will be characterized by different dimensions, and the plane reflector dimensions must be adjusted accordingly.

Each retroreflector is coupled to a support structure that includes provisions for ease of installation, positioning of the retroreflector to yield maximum return of energy to the plane reflector 9, and rigid support of the retroreflector after positional adjustment.

As shown in FIG. 2, a portion of the millimeter-wave energy emitted by the radar antenna 8 propagates along a path that results in its arrival at the plane reflector 9, thus generating beam segment 11. Plane reflector 9 redirects this energy toward the retroreflector 10 forming beam segment 12. The retroreflector returns a substantial portion of the incident energy back by way of beam segment 12 to the plane reflector 9 where it is redirected toward the radar antenna via beam segment 11. The energy received back at the radar antenna has proceeded along a two-way path formed by the plane reflector and retroreflector combination thus forming a beam made up of segments 11 and 12. Within the radar signal processing circuitry, this beam is recognized by its unique radar range that equals the sum of the lengths of beam segments 11 and 12.

Other plane reflectors and retroreflectors, for example reflector 13 and retroreflector 14, are used in appropriate combinations to produce similar beams. Beam segments 15, 16 and 17 are typical examples of segments of such beams. Each beam is characterized by a unique radar range.

Figure 3:
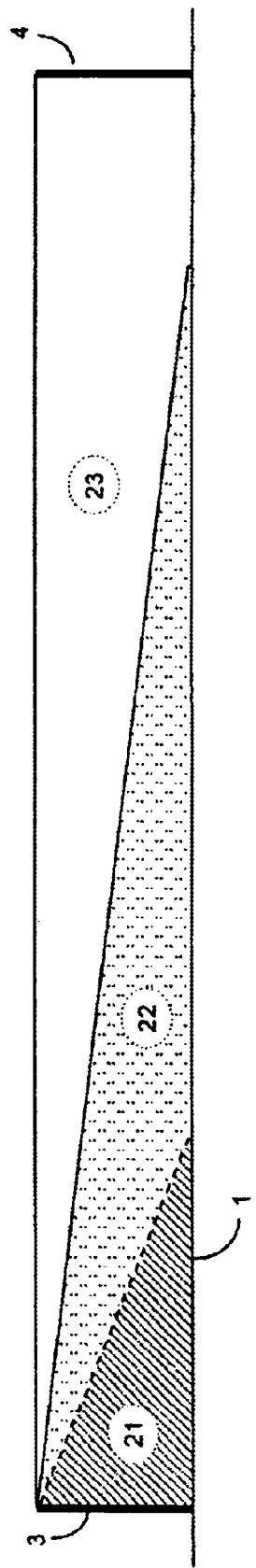
FIG. 3 is an exemplary illustration of the electronic wall of FIG. 1 divided into three zones with each zone having different relative positioning of the plane reflectors and retroreflectors, in accordance with the present invention.

FIG. 3 is an exemplary depiction of the electronic wall 2 divided into three zones with different relative positioning of the plane reflectors and retroreflectors in each zone. The number, shape, and dimensions of the zones may be varied. For the example depicted, the first zone 21 consists of a triangular shaped area extending from the sensor structure for a distance of some 20 to 30 percent of the overall length of the electronic wall. For example, if the electronic wall has an overall length of 300 meters, then the side of the first zone 21 along the surface 1 under the wall has a length of approximately 70 meters. As shown in the figure, the third zone 23 consists of a four sided area bounded on one side by the top of the electronic wall 2, on a second side by the reflector structure 4, a short third side along the surface 1, and a final side joining the portion on the surface to the top of the sensor structure 3. The side along the surface under the electronic wall extends for a distance of some 10 to 20 percent of the overall length of the electronic wall from the reflector structure. For example, with an overall wall length of 300 meters, the side of the third zone 23 extending from the reflector structure along the surface under the wall has a length of approximately 35 meters. The second zone 22 includes the remainder of the electronic wall not within the first or third zones.

In the first zone 21, a plurality of plane reflectors are located along the surface 1 under the electronic wall 2 and their associated retroreflectors are vertically positioned on the sensor structure 3. In the second zone 22, multiple plane reflector and retroreflector combinations are both placed along the surface 1 under the electronic wall. In the third zone, a plurality of plane reflectors are vertically positioned on the reflector structure 4 and their associated retroreflectors are positioned along the surface under the electronic wall at appropriate distances from the reflector structure.

An astute intruder might attempt to either crawl under the beams that form the electronic wall, or might deduce where beams are likely to be and therefore attempt a gymnastic tumbling-like maneuver to jump between beams. The cross section of a prone or crawling human intruder can be represented by an ellipse with a height varying between 0.3 and 0.5 meters, and a width ranging from 0.4 to 0.8 meters. An ellipse having a height of 0.3 meters and a width of 0.5 meters is an appropriate representation for essentially all human intruders, and these dimensions can be used during analysis to determine appropriate placements of the plane reflectors and retroreflectors used to form the electronic wall.

One of the many possible applications of the electronic wall is to count wildlife traversing from one area to another. In this case, an appropriate representation of the "intruder" would be the geometric shape, such as an ellipse, circle or rectangle, that most nearly resembles the cross section of the target wildlife. This geometric shape should be characterized by a width and height that best represent the likely dimensions of the target wildlife. These dimensions may be as small as 0.1 meter to values greater than one meter.

For one exemplary embodiment of the present invention, several significant parameters are defined as a first step in the teaching of the methods used to determine the appropriate positions of plane reflectors and retroreflectors at various locations throughout the electronic wall. In this exemplary embodiment, it is assumed that the electronic wall of has a length of 300 meters, a height of three meters, and comprises three zones. Also, it is assumed that the intruder of interest is a human being that can be represented by an ellipse of 0.3 meters height and width of 0.5 meters. Finally, it is also assumed that the retroreflectors are characterized by an internal edge length of 0.185 meters, and thus generate beams that have a vertical dimension of approximately 0.15 meters. The methods used to determine the placements of plane reflectors and retroreflectors may produce significantly different results if other values are chosen for these basic parameters.

The electronic wall is formed by a multiplicity of beams with separation between the beams sufficiently small that any intruder passing between the beams will obstruct a portion of one or both beams, and thereby cause a sufficient reduction in the amplitude of a beam to yield a detection. The beam separation is that distance from the edge of one beam to the nearest edge of the adjacent beam. Reasonable cost and ease of installation make it highly desirable to use the minimum number of plane reflectors and retroreflectors, and thus the minimum number of beams, that will be sufficient to detect any intruder. Assuming that a human intruder is represented by the aforesaid ellipse having a height of 0.3 meters, a beam separation of 0.25 meters or less will be sufficient to detect any human intruder attempting to pass through the electronic wall. If the intruder of interest is characterized as having some geometric shape with a height different than that ascribed to the human intruder; then the maximum beam separation must be adjusted accordingly.

The spacing from beam center to beam center is the sum of the beam separation plus the beam vertical dimension. For example, if beams that are characterized by a vertical dimension of substantially 0.15 meters and a beam separation of 0.25 meters is sufficient to detect any intruder; then, the maximum beam center-to-center spacing should be 0.4 meters. If other values for these significant parameters are used, the results will change accordingly.

The lower extent of the lowest beams must be sufficiently close to the surface 1 that an intruder cannot crawl under the beams. Since the surface under the electronic wall may exhibit some variation in surface height, it is desirable to place the lowest beams only a small distance above the surface to prevent an intruder from successfully passing under the electronic wall by way of a small depression in surface 1. Therefore, for the example of a human intruder, the spacing between lower extent of the lowest beams and the surface should be no more than 0.25 meters and preferably significantly less.

Figure 4:
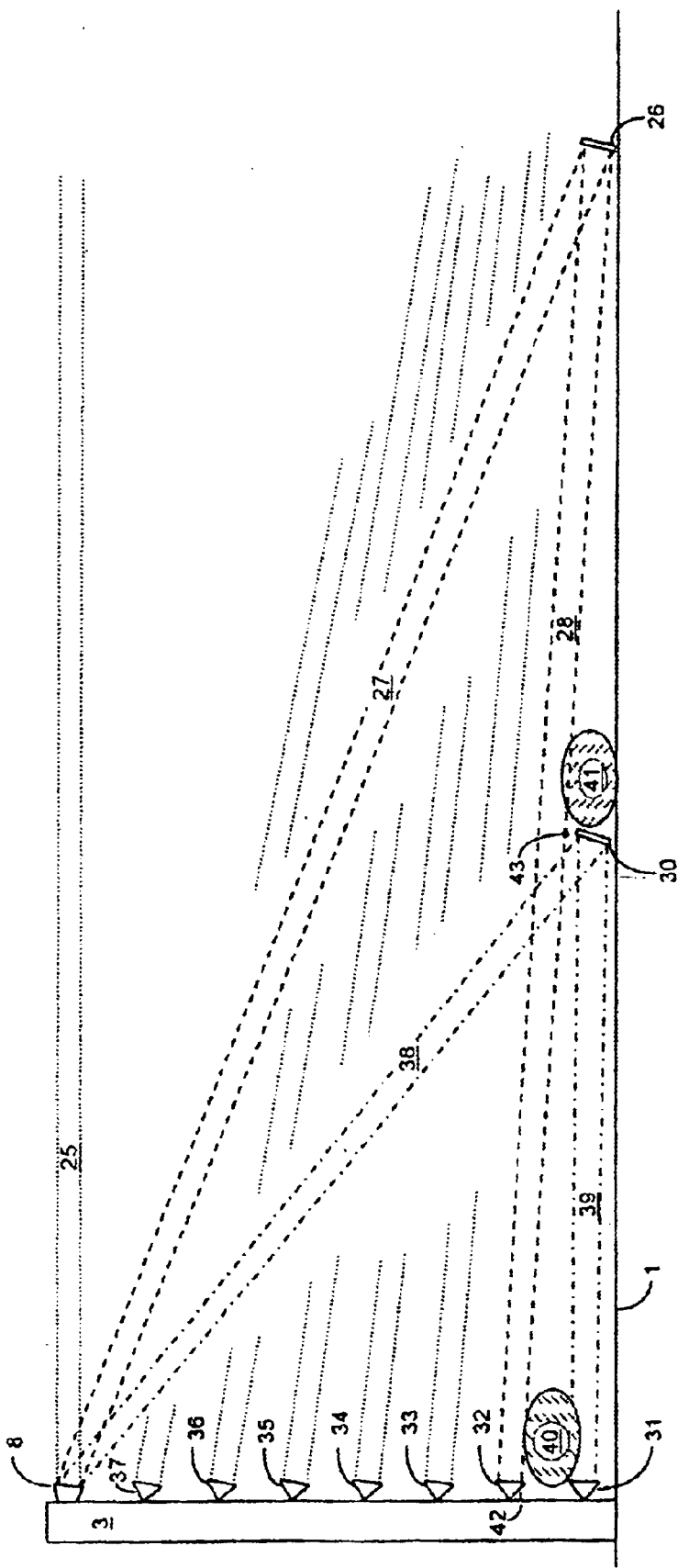
FIG. 4 is an exemplary depiction of the first zone that is near the sensor structure, wherein the plane reflectors are placed along the surface under the electronic wall and the retroreflectors are coupled to the sensor structure, in accordance with the present invention.

FIG. 4 is an exemplary illustration of the arrangement of the plane reflectors and retroreflectors in the first zone 21 near the sensor structure 3. A plurality of retroreflectors, 31 through 37, are coupled to the side of the sensor structure that faces the reflector structure 4 located at the distal end of the electronic wall 2. Seven retroreflectors are shown, the number that are appropriate for the three meter wall height of the exemplary embodiment of the present invention. The number of retroreflectors used may be varied depending upon other desired heights of the electronic wall, different dimensions of the retroreflectors, and the characteristics of the target intruders. For each retroreflector coupled to the sensor structure, a companion plane reflector is located at an appropriate position along the surface under the electronic wall.

For the exemplary embodiment of the present invention, the lowest retroreflector 31 is mounted with the apex of its pyramidal structure positioned a distance of about 0.1 to 0.2 meters above surface 1 over which the electronic wall is formed, for example at about 0.2 meters. The spacing between the apexes of the retroreflectors and thus the spacing between beam centers is maintained at substantially the aforesaid value of 0.4 meters. The same approximate 0.4 meter spacing also occurs between the uppermost retroreflector 37 and the radiation center of radar antenna 8. With the typical beam vertical extent of some 0.15 meters, the maximum space between the beams immediately in front of the retroreflectors is substantially 0.25 meters. If the lowest of seven retroreflectors is located at a height of 0.2 meters above the surface, and the spacing between retroreflectors and the radar antenna is maintained as described above, then the radar antenna is located at a height of approximately three meters above surface 1. Thus, this example the electronic wall 2 has a height of essentially three meters in keeping with the specification for the exemplary embodiment of the invention. If a different height is desired for the wall, the number of retroreflectors can be changed. Further, if the intruder of interest is represented by a geometrical figure of a different height or other retroreflectors are used producing beams having a different vertical dimension; then the number of retroreflectors and spacings between elements must change accordingly.

In FIG. 4, the retroreflectors are depicted as coupled to the side of the sensor structure to allow a graphic display of the existence of the multiple beams generated. A preferred embodiment of the present invention has the retroreflectors coupled to an internal vertical wall within the sensor structure with their apertures covered by a radome material that is transparent to millimeter-wave energy but opaque in the visible spectrum. The radome material is not shown in the figure. Therefore; an intruder examining the sensor structure will not be able to determine where any of the multiple beams may be located.

As shown in FIG. 4, the portion of the emission from the radar antenna 8 that arrives at plane reflector 30, is reflected so that it proceeds to retroreflector 31, where it is returned along the same path to the plane reflector and thus to the radar antenna. Beam segments 38 and 39 define the beam formed by the combination of plane reflector 30 and retroreflector 31. The position of retroreflector 31 on the sensor structure 3 along with a typical beam vertical dimension of approximately 0.15 meters places the lower extent of beam segment 39 substantially at 0.12 meters above the surface 1 immediately in front of the retroreflector. Plane reflector 30 is mounted with its lower edge less than 0.1 meter above surface 1; therefore, the lower extent of beam segment 39 is never more than 0.12 meters above the surface. It is not possible for an intruder to pass under beam segment 39. For purposes of analysis to be discussed below, it will be assumed that the height of the lower extent of beam segment 39 at the sensor structure 3 is identified as $h_1$ and has a value of 0.12 meters. If the point at which retroreflector 31 is coupled to the sensor structure 3 is at a height other than 0.2 meters, then $h_1$ will have a different value.

Beam segment 25 is depicted proceeding from the sensor structure parallel to surface 1, and thus to the top of the distant reflector structure 4. Although not shown, a multiplicity of beam segments emanate from the radar antenna 8 to all the plane reflectors existent along the surface beyond plane reflector 26 and those coupled to reflector structure 4. These beam segments in conjunction with the segments between plane reflectors and retroreflectors result in multiple crisscrossing beams throughout the electronic wall with little space between beams.

Ellipse 40 represents the cross section of an intruder attempting to pass between the beams in the region just in front of the sensor structure 3. This elliptical representation of an intruder's body has the aforesaid vertical dimension of 0.3 meters. As described above, the spacing between beams is substantially 0.25 meters at the retroreflectors. Thus, the intruder cannot pass between the beams without obstructing a portion of one or both beams, thereby causing a sufficient reduction in the amplitude of a beam to be detected. The separation between beam segments 39 and 28 decreases with increasing distance from the sensor structure with the result that passage between these beams is never possible.

Another tactic that an intruder may attempt to employ to penetrate the electronic wall is to crawl immediately behind one of the plane reflectors in the first zone 21, since this location in this zone presents the greatest vertical space not occupied by a beam. Ellipse 41 is shown in FIG. 4 representing an intruder using this tactic. This intruder will be detected if the lower extent of the millimeter-wave beam (segment 28) formed by plane reflector 26 and retroreflector 32 passes over plane reflector 30 at a height above surface 1 that is less than the vertical dimension of ellipse 41. A criterion can be established that the lower extent of a beam from a plane reflector must have a height above the surface that is less than the height of the ellipse representing an intruder as it passes over the next plane reflector closer to the sensor structure. For example, if ellipse 41 represents a human intruder with the aforesaid height of 0.3 meters, then the lower extent of a beam must be no more than approximately 0.25 meters above surface 1 as it passes over the next plane reflector closer to the sensor structure. Such a criterion will assure that any intruder will be detected if attempting to crawl behind a plane reflector, as is represented by ellipse 41.

The criterion established just above enables determination of the maximum allowed spacing in the placement of the plane reflectors associated with the retroreflectors coupled to the sensor structure 3. Referring to FIG. 4, the placement of plane reflector 26 is defined by two similar, right triangles. The surface 1 and the lower extent of beam segment 28 form common sides of these two triangles. The third side of the larger triangle extends up the sensor structure 3 from the surface to point 42. The third side of the smaller triangle extends from the surface up to point 43 directly above plane reflector 30. Additional pairs of similar triangles can be defined for each of the plane reflectors associated with the retroreflectors 32 through 37.

As described above, the distance from the surface up to the point where an extension of the lower extent of beam segment 39 intersects the sensor structure is defined as $h_1$. The repetitive spacing between the retroreflectors on the sensor structure can be identified as $h_2$. Also, the height from the surface up to point 43 can be defined as $h_3$. For the exemplary embodiment of the present invention, aforementioned values have been determined for $h_1$, of 0.12 meters, for $h_2$, of 0.4 meters, and for $h_3$ of 0.25 meters. Further, it can be assumed that the distance from the sensor structure to a plane reflector can be identified as $D_{Zn}$, where the subscript Z identifies the zone and n identifies the sequential position of the plane reflector, both with respect to the sensor structure. The first zone is that depicted in FIG. 3, located nearest to the sensor structure 3.

Those of skill in the art will recognize that the maximum allowable distance that the plane reflectors can be located from the sensor structure is defined by the following similar triangles relation:

$$\frac{D_{1n}}{h_1 + h_2 * (n-1)} = \frac{D_{1n} - D_{1n-1}}{h_3}$$

Thus:

$$D_{1n} = \frac{(h_1 + h_2 * (n-1)) * D_{1n-1}}{(h_1 - h_3 + h_2 * (n-1))}$$

$D_{11}$ is the distance from the sensor structure to the location of the nearest plane reflector 30. $D_{11}$ can be chosen to have any value between the limits of approximately 6 and 30 meters. If, for example, a value of 15 meters is chosen for $D_{11}$; TABLE 1 provides the results of the equation for the distances from the sensor structure to the seven plane reflectors used in the first zone of the exemplary embodiment of the present invention. The distances listed have been rounded to the nearest whole number; a simplification that does not result in loss of detection effectiveness for the electronic wall. The apparent radar range produced by each plane reflector and retroreflector combination is also determined by simple calculations involving beam segment lengths. The radar has a range resolution of substantially one meter.

TABLE 1

Placement of Plane Reflectors in the First Zone

| Plane Reflector Number | Distance, $D_{1n}$ meters | Radar Range meters |
|---|---|---|
| 1 | 15 | 30 |
| 2 | 29 | 58 |
| 3 | 40 | 80 |
| 4 | 49 | 98 |
| 5 | 57 | 114 |
| 6 | 65 | 130 |
| 7 | 72 | 144 |

Other embodiments of the present invention that are designed to detect intruders characterized by a different height, or that have other variations in component characteristics, such as retroreflectors that produce beams of different vertical extent, will require alternate determinations of values for the terms: $h_1$, $h_2$, $h_3$. The result will be the determination of different values for the distance, $D_{1n}$.

Figure 5:
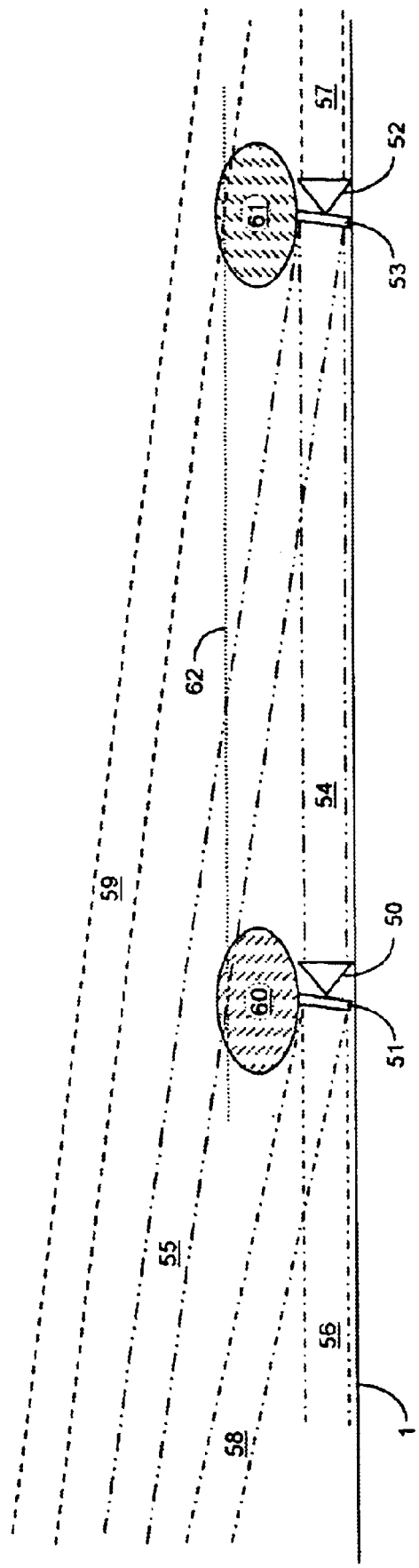
FIG. 5 is an exemplary illustration of the positional relationship of the plane reflector and retroreflector combinations used in the second zone with both devices being placed along the surface under the electronic wall, in accordance with the present invention.

FIG. 5 is an exemplary illustration of the positional relationship of the plane reflector and retroreflector combinations that is used throughout the second zone 22 of the electronic wall 2. In the same manner as that depicted in FIG. 2, the plane reflectors and retroreflectors are located on the surface 1 under the electronic wall along a line that extends from sensor structure 3 to the reflector structure 4. As shown in FIG. 5, the retroreflector 50 is positioned immediately behind plane reflector 51, and retroreflector 52 is located just behind plane reflector 53. The combination of plane reflector 53 and retroreflector 50 forms beam segment 54 that extends parallel to and just above surface 1. Other plane reflector and retroreflector combinations form other beam segments that are also parallel to the surface; with examples being beam segments 56 and 57. Thus, beam segments are projected just above the surface along the entire length of the second zone. In this zone, a plane reflector and a retroreflector along with their associated support structures may be coupled together to form a plane reflector—retroreflector assembly for ease of installation. Plane reflector 51 and retroreflector 50 are included in such an assembly.

The sensor structure 3 is located out of view to the left of that portion of the second zone 22 shown in FIG. 5. Multiple beam segments proceed from the radar antenna 8 to the plurality of plane reflectors positioned along the surface, with portions of beam segments 55, 58 and 59 being examples. Other beam segments exist above beam segment 59, but are not shown in the subject figure. As an example of beam formation, the energy contained within beam segment 55 is redirected by plane reflector 53 toward retroreflector 50 thus forming beam segment 54. The retroreflector returns a substantial portion of the incident energy back by way of beam segment 54 to the plane reflector 53 where it is redirected toward the radar antenna via beam segment 55. Thus, a beam is formed having a known two-way path and unique radar range equal to the sum of the length of beam segments 54 and 55.

Observation of the beam segment paths depicted in FIG. 5 reveals that the greatest spacing between beam segments occurs directly above a plane reflector—retroreflector assembly. An astute intruder might attempt to pass through the electronic wall 2 by crawling directly over the top of an assembly through this location of widest spacing. Ellipses 60 and 61 represent the cross section of intruders attempting such a penetration. If the distance from the top of a plane reflector—retroreflector assembly to the closest beam segment located above it is sufficiently small, the intruder will obstruct a portion of the beam segment and thereby cause a sufficient reduction in the beam amplitude to result in detection.

For the exemplary embodiment of the present invention, the intruder's body is represented by an ellipse having the aforesaid height of 0.3 meters. Therefore; for this embodiment, the distance from the top of a plane reflector—retroreflector assembly to the beam segment above it can be no greater than substantially 0.25 meters to assure detection of any intruder.

Shown in FIG. 5 is a line 62 that is parallel to the surface 1 and is placed at a height above the surface that is substantially 0.25 meters above the tops of the plane reflector—retroreflector assemblies. Since the vertical extent of a plane reflector is approximately 0.2 meters, line 62 is placed at a height $h_4$ that is the sum of these two values or substantially 0.45 meters above the surface. If the plane reflector—retroreflector assemblies are appropriately spaced, then the lower extent of each of the beam segments linking the radar antenna 8 and the plane reflectors will intersect line 62 at points directly above the next plane reflector—retroreflector assembly that is closer to the sensor structure 3. This appropriate spacing is demonstrated in FIG. 5 by the lower extent of beam segment 55 intersecting line 62 at a point 0.25 meters above plane reflector 51 (substantially 0.45 meters above the surface 1) and thus impinging upon ellipse 60. Also, the lower extent of beam segment 59 intersects line 62 directly over plane reflector 53. The result is a detection of any intruder represented by either ellipse 60 or 61.

Once again, the analysis of similar triangles allows determination of the appropriate spacings of the plane reflector—retroreflector assemblies in the second zone. For analysis purposes consider that the surface 1 and the lower extent of beam segment 55 comprise two common sides of two similar right triangles. The third side of the larger triangle is formed by the sensor structure 3 from the surface up to radar antenna 8, the source of beam segment 55. Thus, the lower extent of beam segment 55 intersects the sensor structure at the location of the radar antenna, a height $h_5$ of essentially 3.0 meters above surface 1 for the exemplary embodiment of the present invention. The height of the third side of the smaller triangle is the distance from the surface up to line 62, i.e., a height $h_4$ of substantially 0.45 meters.

In keeping with the nomenclature established for the first zone, it can be assumed that the distance from the sensor structure to a plane reflector is identified as $D_{Zn}$, where the subscript Z identifies the zone and n identifies sequential position of the plane reflector in that zone, both with respect to the sensor structure. For the two similar triangles under consideration; the side of the larger triangle that lies along the surface has a length of $D_{2n}$, while the similar side of the smaller triangle has a length of $D_{2n}-D_{2n-1}$.

Those of skill in the art will recognize that the maximum allowable distance that the plane reflectors can be located from the sensor structure is defined by the following similar triangles relation:

$$\frac{D_{2n}}{h_5} = \frac{D_{2n} - D_{2n-1}}{h_4}$$

Thus:

$$D_{2n} = \frac{h_5 * D_{2n-1}}{h_5 - h_4}$$

For the configuration of the exemplary embodiment of the present invention and the values for $h_4$ and $h_5$ defined above:

$$D_{2n} = 1.182 * D_{2n-1}$$

The distance, $D_{17}$ derived during the analysis of the first zone (see TABLE 1), has a value of 72 meters, and also defines the reference (n=0) position for determining the locations of plane reflector—retroreflector assemblies in the second zone. The computed distances have been rounded to the nearest whole number; a simplification that does not result in loss of detection effectiveness for the electronic wall. The apparent radar range produced by each plane reflector and retroreflector combination is also determined by summing the beam segment lengths.

An initial determination of positions for some of the plane reflector—retroreflector assemblies using the equation above resulted in several radar ranges being essentially identical to those derived for placements in the first zone. Since all radar ranges must be unique, the positions were altered by reducing the computed distance by one or two meters. The result is a sufficient reduction in the radar range to eliminate any conflict with radar ranges in the first zone. The results listed in TABLE 2 include these radar range adjustments.

TABLE 2

Placement of Plane Reflector - Retroreflector Assemblies in the Second Zone

| Plane Reflector Number | Distance, $D_{2n}$ meters | Radar Range meters |
|---|---|---|
| 1 | 83 | 94 |
| 2 | 97 | 111 |
| 3 | 115 | 133 |
| 4 | 136 | 157 |
| 5 | 161 | 186 |
| 6 | 190 | 219 |
| 7 | 225 | 260 |
| 8 | 266 | 307 |

Other embodiments of the present invention that are designed to detect intruders characterized by a different height, or that have other variations in component characteristics, such as plane reflectors and retroreflectors that produce beams of different vertical extent, or have an electronic wall of different overall height; will require alternate determinations of values for the terms: $h_4$ and $h_5$. The result will be the derivation of different values for the distances, $D_{2n}$.

Figure 6:
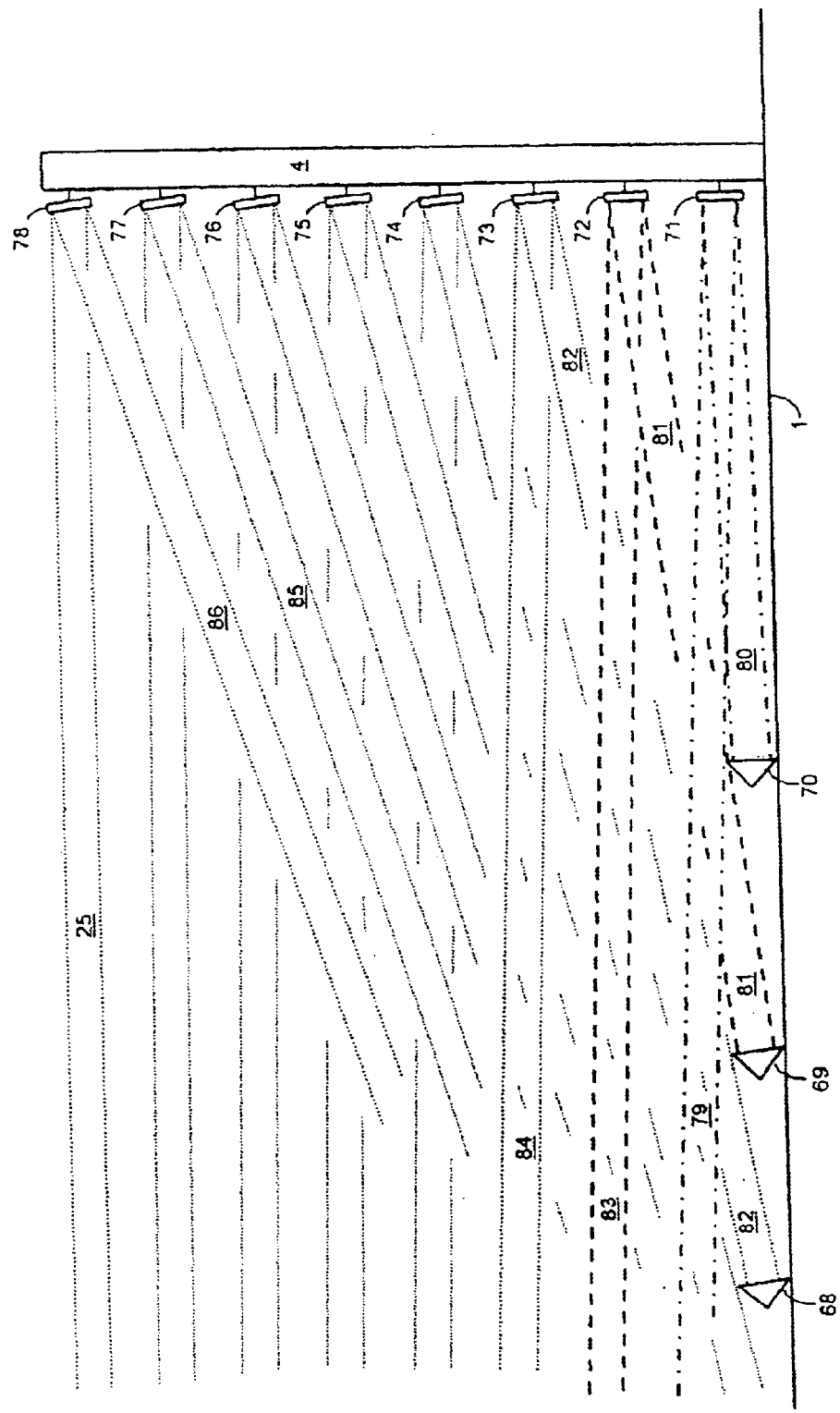
FIG. 6 is an exemplary depiction of a portion of the third zone including the reflector structure with plane reflectors coupled thereto, and retroreflectors placed along the surface under the electronic wall, in accordance with the present invention.

FIG. 6 is an exemplary depiction of a portion of the third zone 23 including the reflector structure 4, the plane reflectors coupled to this structure, their associated retroreflectors positioned along the surface 1 to form the lower extent of the electronic wall, and a portion of the numerous beam segments existent in the third zone. Multiple plane reflectors, shown as reflectors 71 through 78, are coupled to the reflector structure. The coupling mechanism allows the positioning of each plane reflector to direct the reflected energy toward its appropriate retroreflector. Although eight plane reflectors are shown, the number used may be varied depending upon the desired height of the electronic wall, the vertical extent of the millimeter-wave beams and the height of the body of an intruder attempting to pass through the electronic wall.

In the exemplary embodiment of the present invention, each plane reflector has vertical and horizontal dimensions of substantially 0.2 height by 0.23 meters width. The lowest plane reflector 71 is positioned with its center located approximately 0.2 meters above surface 1, thus its lower extent is approximately 0.1 meter above that surface. The spacing between the coupling points of the plane reflectors is substantially 0.4 meters with the result that a space of no more than 0.25 meters exists between beams associated with successive plane reflectors, assuming that the vertical extent of the beams is substantially 0.15 meters. Thus, assuming the use of eight plane reflectors, the center of plane reflector 78 is substantially 3.0 meters above surface 1 in keeping with the aforesaid specifications of the exemplary embodiment of the present invention.

The exemplary embodiment of the present invention has an assumed electronic wall length of 300 meters and height of three meters. As shown in FIG. 6, retroreflector 70 is placed on surface 1 on the line extending between the sensor and reflector structures at a location about 10 meters from the reflector structure 4, and thus at a distance of approximately 290 meters from the sensor structure. Retroreflectors 69 and 68 are located at positions about 15 and 19 meters from the reflector structure, and thus at distances of some 285 and 281 meters from the sensor structure. The retroreflectors (not shown in FIG. 6) associated with plane reflectors 74 through 78 are spaced about 3 meters apart, beginning 3 meters from retroreflector 68. This spacing places the retroreflector associated with plane reflector 78 adjacent to the plane reflector in the second zone that is located at a distance $D_{28}$ of about 266 meters from the sensor structure (see Table 2).

Beam segment 79 extends from the radar antenna 8 on the sensor structure 3 to plane reflector 71. The reflected beam segment 80 connects plane reflector 71 to retroreflector 70. As in other zones of the electronic wall, the vertical extent of these beam segments is approximately 0.15 meters based on the use of a retroreflector having the aforementioned internal edge length of 0.185 meters. The lower extent of beam segment 79 originates at a height of approximately three meters at the sensor structure 3 and arrives at the lower portion of plane reflector 71, at essentially 0.1 meter above surface 1. Analysis of these dimensions will reveal that the lower extent of beam segment 79 passes over retroreflector 70 at a height of some 0.25 meters, approximately the same height as the upper extent of the retroreflector.

Beam segment 83 extends from the radar antenna to plane reflector 72, and beam segment 81 connects plane reflector 72 to retroreflector 69. Similarly, beam segment 84 extends from the radar antenna to plane reflector 73, and beam segment 82 completes the beam by connecting plane reflector 73 to retroreflector 68. With the positioning along the surface described above, the placement of the plane reflectors on the reflector structure defined above, and a typical beam vertical extent of 0.15 meters; each of these beam segments pass immediately above the next retroreflector closer to the reflector structure 4. In the area between the retroreflectors, the maximum height of a beam segment does not exceed approximately 0.25 meters, and thus it is not possible for an intruder represented by the aforesaid height of 0.3 meters to crawl under the beams in the third zone. Beam segments connect the radar antenna 8 to each of the plane reflectors coupled to the reflector structure. The placement of these plane reflectors defined above results in the maximum spacing between beams never being more than approximately 0.25 meters at any location in the third zone. The uppermost beam in the electronic wall 2 is formed by segments 25 and 86.

Figure 7:
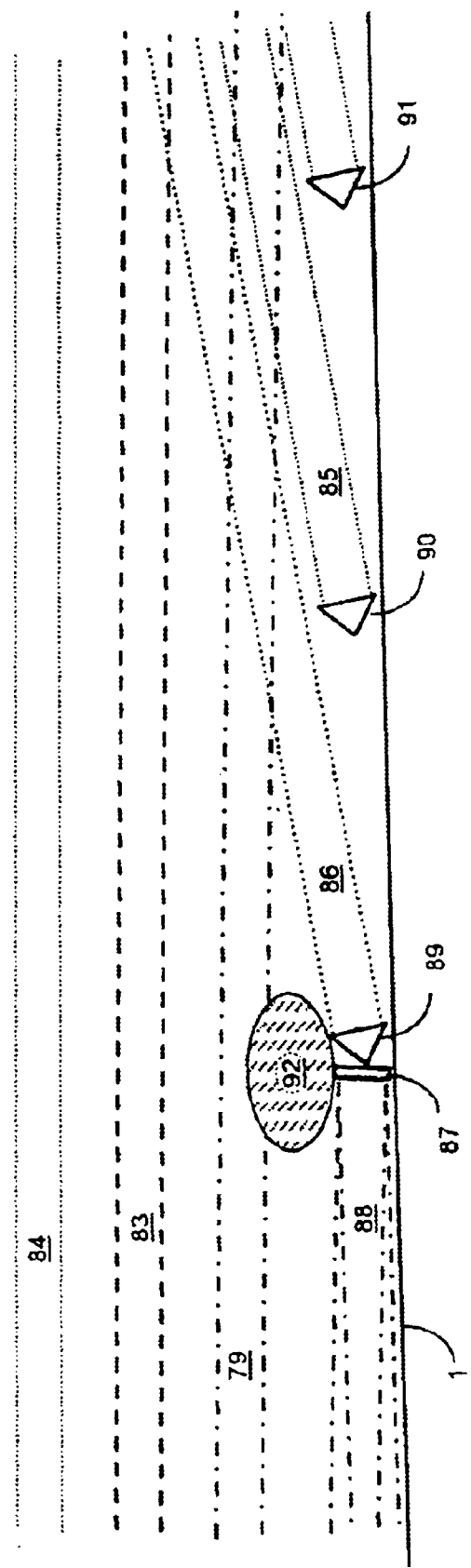
FIG. 7 is an exemplary illustration of the region of the electronic wall that includes the transition between the second and third zones and the placement of plane reflectors and retroreflectors that make up the transition, in accordance with the present invention.

FIG. 7 is an exemplary illustration of the transition between the second and third zones in the portion of the electronic wall adjacent to the underlying surface 1, in accordance with the exemplary embodiment of the present invention. Plane reflector 87 is the eighth reflector in the second zone, and is located at a distance of about 266 meters from the sensor structure as shown in Table 2. Beam 88 includes the beam segments between the radar antenna and plane reflector 87, and thus to its associated retroreflector. The figure shows the continuations of several beam segments depicted in FIG. 6; in particular, segments 79, 83, 84, 85, and 86.

Beam segment 79 extends from the radar antenna to plane reflector 71 (shown in FIG. 6). Those of skill in the art can determine by simple geometry that beam segment 79 passes over plane reflector 87 at a height of substantially 0.42 meters above surface 1, or some 0.22 meters above the plane reflector. The ellipse 92 represents the cross section of an intruder with the aforesaid height of 0.3 meters attempting to pass through the electronic wall by crawling directly over plane reflector 87 and retroreflector 89 located next to it. The close proximity of beam segment 79 makes it impossible for such an intrusion attempt to be successful.

Retroreflectors 89, 90, and 91 are those coupled by beam segments to plane reflectors 78, 77, and 76 respectively (shown in FIG. 6). As shown, retroreflector 89 is positioned next to plane reflector 87 at the transition between the second and third zones. This transition occurs at a distance of about 266 meters from the sensor structure. As stated in the discussion of FIG. 6, an intruder also cannot crawl under any of the beams by passing next to a retroreflector. For example, beam segment 86 passes at a height of only approximately 0.25 meters above the surface at the location of the next retroreflector 90.

The plane reflectors employed in the third zone are all coupled to the reflector structure at a distance of substantially 300 meters from the sensor structure. Their associated retroreflectors are located along the surface at selected positions. Table 3 defines the placement of these retroreflectors and the resulting apparent radar range of each of the beams occupying this zone.

TABLE 3

Placement of Retroreflectors in the Third Zone

| Retroreflector Number | Distance, $D_{3n}$ meters | Distance from Reflector Structure meters | Radar Range meters |
|---|---|---|---|
| 1 | 290 | 10 | 310 |
| 2 | 285 | 15 | 315 |
| 3 | 281 | 19 | 319 |
| 4 | 278 | 22 | 322 |
| 5 | 275 | 25 | 325 |
| 6 | 272 | 28 | 328 |
| 7 | 269 | 31 | 331 |
| 8 | 266 | 34 | 334 |

The method of determining the placements of plane reflectors and retroreflectors applied to the exemplary embodiment of the present invention has resulted in placements in three zones as defined in Tables 1, 2, and 3. This exemplary configuration uses a total of twenty three combinations of plane reflectors and retroreflectors. Other embodiments of the present invention with different specifications and other representations of the target intruder may be defined. In this case, the same methods can be used to determine the placements of the plane reflectors and retroreflectors; however, the configurations of zones, the numbers of plane reflectors and retroreflectors required, and their placements can be expected to change significantly from the example provided herein.

Figure 8:
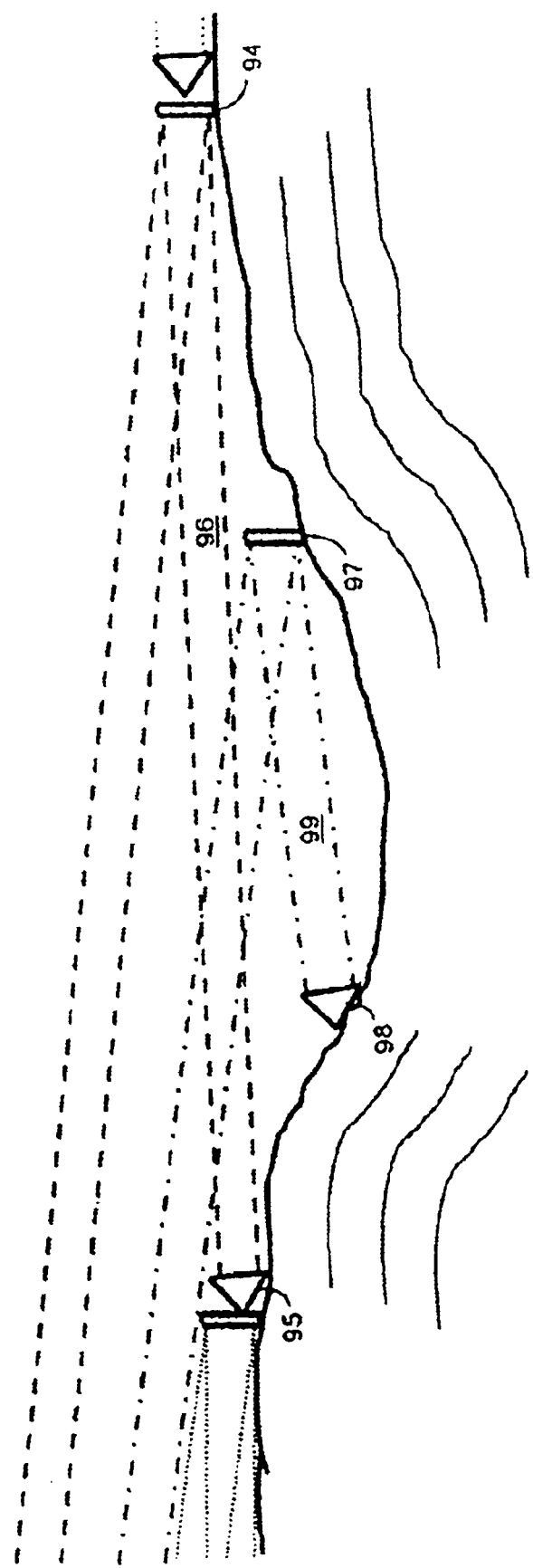
FIG. 8 is an exemplary depiction of a localized area of uneven terrain existent under the electronic wall and the arrangement of plane reflectors and retroreflectors to provide beam segments that will not allow an intruder to pass under the wall without detection, in accordance with the present invention.

The example placements of the plane reflectors and retroreflectors for the exemplary embodiment of the present invention are predicated on the surface 1 underlying the electronic wall being substantially flat. The electronic wall can be established over uneven terrain with appropriate adjustments in the positioning of the plane reflectors and retroreflectors. The principles defined above can be applied as needed to determine the required placements of plane reflectors and retroreflectors to provide a sufficient number of beams so that any intruder attempting to pass through the wall will be detected. FIG. 8 depicts a localized area of uneven terrain such as a gully or drainage ditch existent under the electronic wall. If the depression were not there, plane reflector 94 and retroreflector 95 would protect this area of the electronic wall by means of beam segment 96. Plane reflector 97 and retroreflector 98 have been added to produce beam segment 99 that prevents any intruder from crawling through the depression under the electronic wall without detection.

Those skilled in the art will recognize that other arrangements, positions and combinations of plane reflectors and retroreflectors also fall within the scope of the present invention.

A radar is included in the sensor structure 3 to emit and receive the millimeter-wave energy that forms the multiple beams making up the electronic wall. One of the primary requirements for the radar is to provide a range resolution sufficient to identify the different radar range returns from each beam. A one-meter range resolution is necessary to provide this capability. Other requirements for the radar include operation at millimeter-wave frequencies, moderate component costs and low power consumption.

An example of the operational principles of the radar is discussed in the following paragraphs. This example assumes that the electronic wall is formed by the exemplary embodiment of the present invention with the previously specified values for wall length, plane reflector and retroreflector placement, etc. Other embodiments of the invention providing a wall having other component characteristics and placements, and other wall dimensions, will result in differences in the below stated values of significant parameters. These other embodiments are included within the spirit and scope of the present invention.

Figure 9:
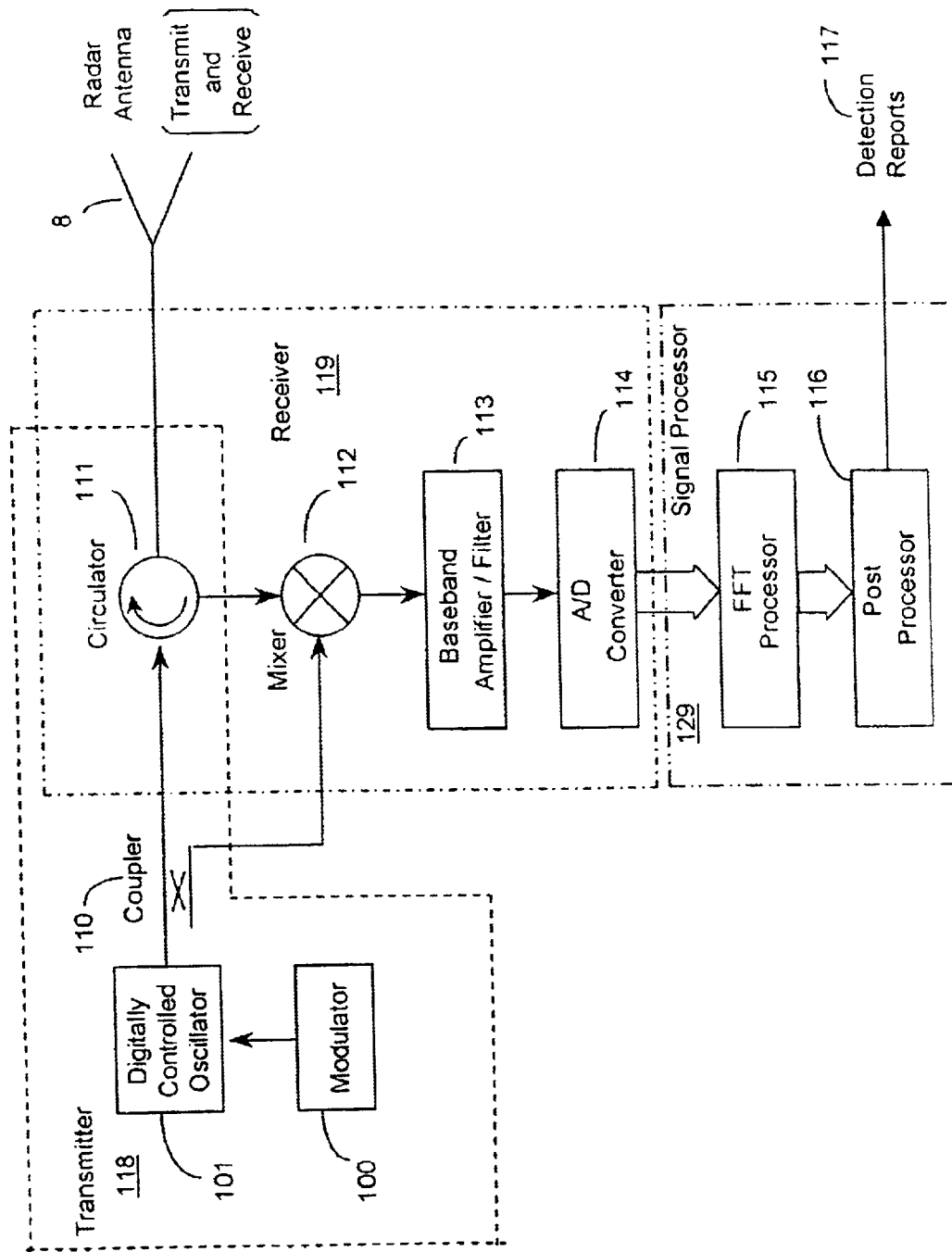
FIG. 9 is an exemplary block diagram illustrating the FM-CW radar included within the sensor structure, in accordance with the present invention.
Figure 10:
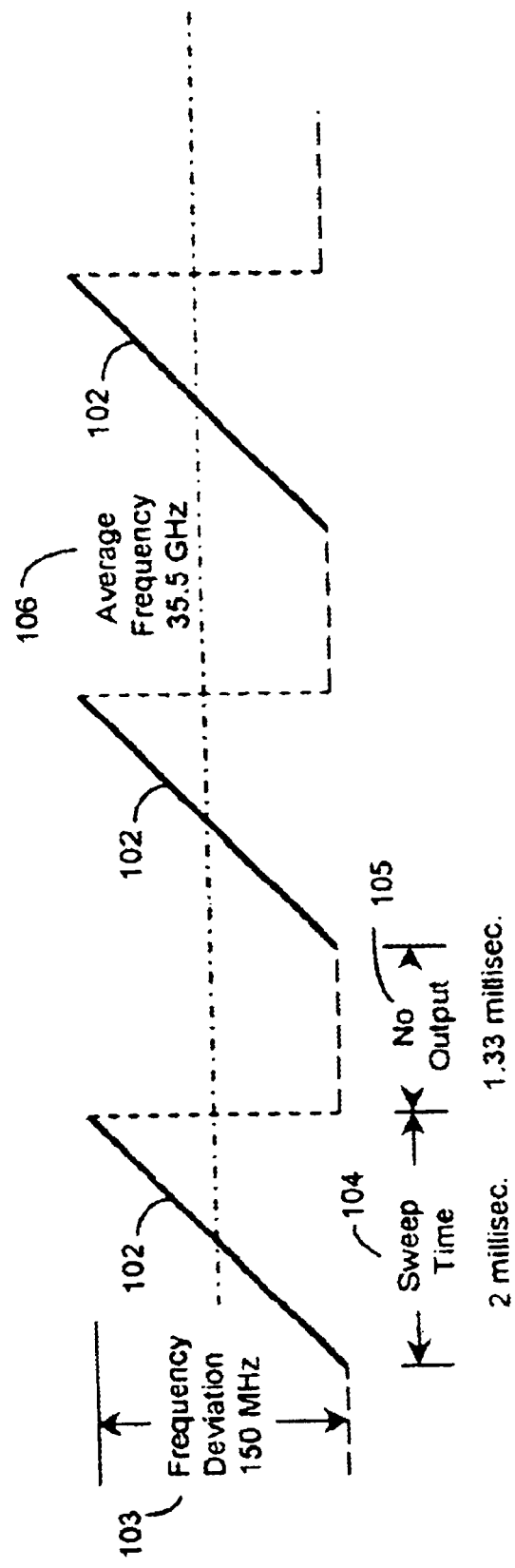
FIG. 10 is an exemplary illustration, representing the swept waveform generated by the FM-CW radar, in accordance with the present invention.

FIG. 9 is an exemplary illustration showing the block diagram of the FM-CW radar included in the exemplary embodiment of the present invention. The modulator 100 includes digital circuitry that controls the frequency modulation sweep time, frequency deviation, sweep repeat rate, and periods of output of the digitally controlled oscillator (DCO) 101 to form a modified FM-CW modulation waveform. FIG. 10 is a frequency versus time plot of the DCO signal output 102. Shown are three of the continuously repeated frequency sweeps with each characterized by a highly linear positive increase in frequency with time. It is well known to those of skill in the art that a frequency deviation 103 of substantially 150 Megahertz is required in order to achieve a range resolution of one meter, and thus the modulator 100 is designed to provide a highly linear frequency sweep with this deviation.

The sweep time plus the no output interval define the rate at which data is accumulated for further processing. A sufficiently high data update rate permits averaging and thresholding techniques to be used to assure that any intruder causing a complete or partial interruption of any beam is detected, while preventing random noise existent in an occasional data set from causing a false alarm. A running intruder may pass through the electronic wall in less than 40 milliseconds and it is highly desirable to gather a significant number of data records during that length of time to assure detection. For the exemplary embodiment of the present invention, a sweep time of substantially 2.0 milliseconds and a no output time of 1.33 milliseconds was chosen. These values provide a data update rate of substantially 300 records per second, or at least 12 records for the running intruder mentioned above. The DCO 101 incorporates commercially available components that provide a power output of some 5 milliwatts at an average frequency 106 of approximately 35.5 Gigahertz. Operation in other millimeter-wave bands is also possible with appropriate changes in component selection and reevaluation of design parameters.

As shown in FIG. 9, the DCO signal output is passed through the coupler 110 and circulator 111 to the antenna 8. The modulator 100, digitally controlled oscillator 101, coupler 110 and circulator 111 comprise the transmitter 118 portion of the radar, and provides the functions of generating and modulating the electromagnetic wave energy to be supplied to the radar antenna 8. The antenna both emits the energy produced by the transmitter and collects energy returned from the combinations of plane reflectors and retroreflectors, and also energy reflected from the person of intruders and ground clutter located near the sensor structure 3. The antenna accomplishes emission and reception simultaneously. The received energy is routed to the mixer 112 by the circulator 111. The components selected for the exemplary embodiment radar provide a transmit-receive isolation ranging from 20 to 26 dB. The coupler 110 samples a portion of the DCO signal output and supplies it to the mixer where the DCO output sample and the received signal are heterodyned to form a signal with frequency content that is the difference between the frequencies of the two mixer inputs. The mixer output ranges in frequency from substantially zero to several hundred kilohertz, referred to as the baseband spectrum by those of skill in the art.

The return from a single stationary target within the range of interest will be a replica of the swept DCO output signal reduced in amplitude and delayed in time in keeping with known principles of radar. At any point in time, the difference in frequency between the swept transmitted and received signals is a function of their time separation due to target range. The frequency difference, FD, for a fixed position target will remain constant during the entire sweep time. Those skilled in the art will recognize that the relationship of the significant parameters to the difference frequency is given by:

$$F_D = (2 \times R \times \Delta F)/(c \times T_s)$$

where R is the range to the target, $\Delta F$ is the frequency deviation, c is the speed of light, and $T_s$ is the sweep time.

Targets at greater ranges produce higher frequency signals. The return from plane reflector 71, located just above the base of reflector structure 4, and its associated retroreflector 70 located at about 10 meters from the reflector structure will result in a radar range of approximately 310 meters, and thus a signal with a difference frequency of some 155 kilohertz. Each target at a different range will yield a signal component characterized by a frequency in keeping with the relationship above and an amplitude related to its radar cross section and range. The sum of all signals from all targets within the baseband spectrum comprises the main output of the mixer 112 that is supplied to the baseband amplifier/filter 113.

Included within the baseband amplifier/filter 113 is an antialiasing filter that suppresses all signals with frequencies greater than about 180 kilohertz (equivalent to about 360 meters range) to eliminate spurious responses due to large out-of-range targets, unwanted mixing products from the mixer and to prevent spectrum foldover. Also included is a high pass resister-capacitor (RC) network to provide attenuation of the returns from plane reflector/retroreflector combinations at close range that are characterized by lower frequencies and larger signal amplitudes. The use of the RC network reduces the variation in amplitude of returns over the entire range of operation. In addition, the baseband amplifier/filter 113 includes a low noise amplifier capable of increasing the amplitude of the filtered signal to a level sufficient to meet the input requirements of the analog to digital (A/D) converter 114.

The A/D converter 114 operates at a sample rate of substantially 500 kilohertz, collecting samples of the analog signal coming from the baseband amplifier/filter 113 during and slightly after the 2.0 millisecond sweep time of each DCO output signal. 1024 samples are collected with each sample being converted to a 12 bit digital word.

The circulator 111, mixer 112, baseband amplifier/filter and A/D converter 114 comprise the receiver 119 portion of the FM-CW radar. The circulator 111 is common to both the transmitter 118 and the receiver 119. The receiver performs the functions of collecting the electromagnetic energy returned from the reflectors, as well as energy reflected from the person of intruders, and of converting the information content in this energy into digital data for further processing by the signal processor 129.

A 1024 bit, real number, Fast Fourier Transform (FFT) processor 115 inputs the succession of 12 bit digital words and produces a digital representation of the inputted signal spectrum divided into 512 equally spaced frequency bins. Due to the FM-CW radar relationship between target range and frequency, each bin represents a one-meter segment of range, and thus the bins can be referred to as range bins with coverage from about one meter out to approximately 512 meters. At the conclusion of each swept DCO output signal period, the amplitude of the digital word in each range bin is a function of the radar cross section of any target at the corresponding range, the $R^{4th}$ radar range law, and the high pass filter effect of the RC circuit in the baseband amplifier/filter 113.

During the 1.33 millisecond no-output interval between transmissions, the post processor 116 down loads from the FFT processor 115 the target amplitude data in the range bins of interest. Although the FFT processor generates 512 range bins of data, those representing ranges greater than approximately 336 meters are of no interest, assuming that the reflector structure is located at the aforesaid range of about 300 meters and the plane reflector/retroreflector combinations are positioned as previously discussed. Only the data contained within range bins 1 through 336 are down loaded to the post processor for evaluation.

Shortly after the electronic wall is initially activated, the post processor 116 undergoes a learning mode to determine the normal state with no intruders. During this learning mode, the level in each range bin is measured over a sufficient number of samples to determine the average amplitude of the returns for that range. Of the 336 range bins, only 23 will have returns from combinations of plane reflectors and retroreflectors that produce signals of significant amplitude. The other bins may contain low-level signals due to ground clutter returns and background noise. Periodically the post processor undergoes a brief self-test to reestablish the validity of the threshold values in use.

Figure 11:
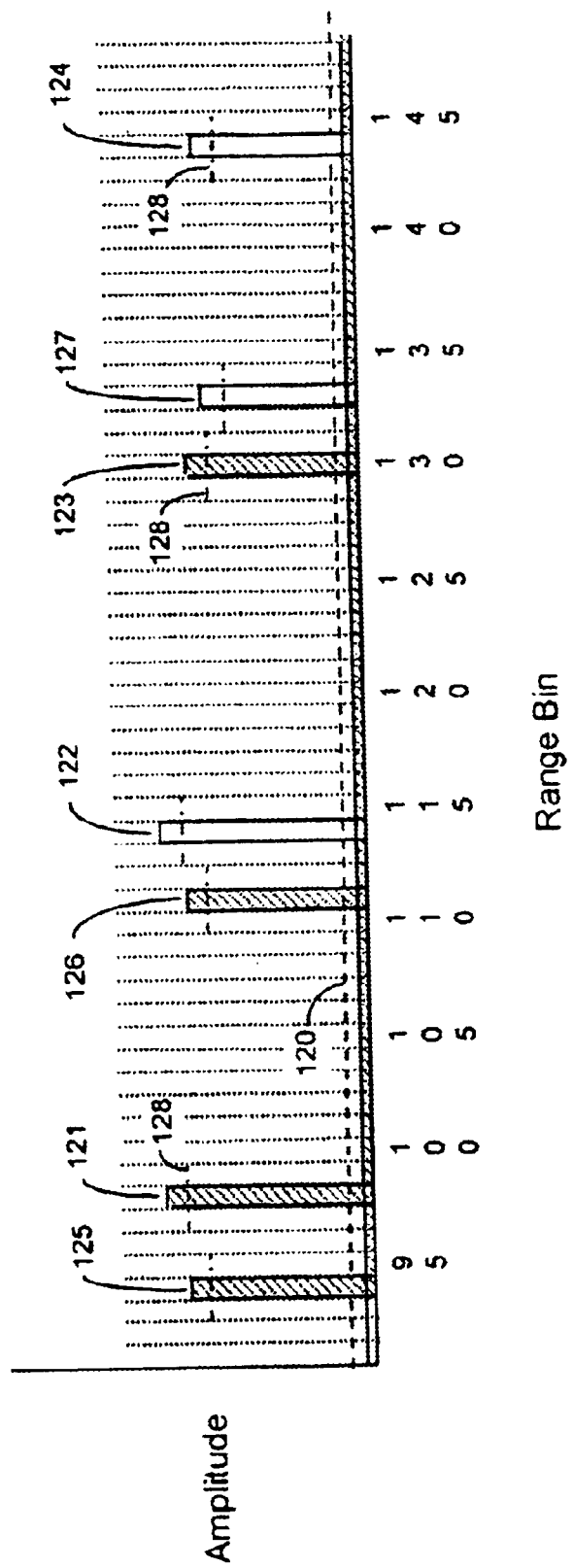
FIG. 11 is an exemplary depiction of a range bin versus amplitude plot of a portion of the data under analysis by the post processor, with the data set including returns from both the first and second zones of the electronic wall, in accordance with the present invention.

FIG. 11 is an exemplary depiction of a range bin versus amplitude plot of the data down loaded to the post processor including that for range bins 94 through 148. This set of data includes returns from both the first and second zones of the electronic wall. Receiver noise and small returns from ground clutter is depicted by the shaded area in all range bins seen just above the zero amplitude line. A threshold 120 is established for each bin that does not contain a return from a plane reflector and retroreflector. This threshold 120 is sufficiently greater than the average value of receiver and clutter noise, seen during the learning mode, that during normal operation with no intruder present the signal amplitude in any of these bins has an extremely low probability of exceeding this threshold. If an intruder passes through the electronic wall, the return from his person and any equipment that he may be carrying is likely to provide a sufficiently large radar return to exceed threshold 120 for the range bin equivalent to his range from the sensor structure. The FM sweep repetition rate of substantially 3.33 milliseconds allows the post processor 116 to analyze ten or more data sets for each range bin during the time that a running intruder could pass through the electronic wall. A crawling intruder will move slowly enough to allow a much larger number of data sets to be generated and analyzed. Therefore, the post processor can discriminate between a random crossing of threshold 120 due to noise and that due to an intruder. If an intruder is detected, a detection report 117 is generated that includes the range to the intruder. Each detection report is communicated to the operator of the electronic wall.

As seen in FIG. 11, the radar returns from combinations of plane reflectors and retroreflectors have amplitudes much greater than that of receiver and ground clutter noise. The range bin containing a return from a combination does not define the range from the sensor structure to either the plane reflector or retroreflector but the sum of the two segments making up the beam formed by that combination. Tables 1, 2, and 3 supply the positional relationships to the radar range (or range bin) for each combination. Comparison of the data in the Tables with FIG. 11 will reveal that returns 121, 122, 123, and 124 are listed in Table 1 for the first zone and come from plane reflectors No. 4 through 7. Returns 125 through 127 are those for plane reflectors No. 1, 2 and 3 in the second zone as listed in Table 2.

During the learning and self-test modes the post processor 116 determines the average signal value for each range bin containing a plane reflector—retroreflector return. It then establishes a negative threshold 128 that has a value sufficiently less than the average value that it is highly unlikely that the signal level will drop below the threshold unless the beam is partially or completely blocked. The threshold setting allows detection of a reduction in the beam amplitude due to only a partial blockage of the beam. The post processor 116 repeatedly analyzes the amplitude data from each of these range bins and can differentiate between a signal reduction below the threshold due to an intruder and a signal reduction that is a random event due to noise, etc.

A review of Tables 1, 2, and 3 reveals that the radar range associated with a plane reflector/retroreflector combination is unique for each of the 23 combinations used. The beam segments produced by each combination form a portion of the electronic wall. A reduction in the return signal below the threshold for a radar range associated with a particular plane reflector/retroreflector combination indicates that a partial or complete blockage of a beam segment produced by that combination is occurring. The intruder thus detected is most likely located at a range less than the position of the plane reflector and greater than the position of the retroreflector. The post processor 116 includes a look-up table in computer memory that associates each of the 23 range bins containing a beam return with the locations of its plane reflector and retroreflector, and the paths of the beam segments that they produce. By consulting the look-up table, the post processor can define the likely location of any intruder that is blocking a beam.

If an intruder passes through the electronic wall by walking or running, a number of beams will be blocked. Substantially all beam segments that make up the electronic wall from the surface up to the height of the intruder, and that are coupled to plane reflectors at a greater range than the intruder will be blocked. If a detection occurs for only a single plane reflector/retroreflector combination, it is probable that an intruder is attempting to crawl under the beams making up the electronic wall and is blocking the beam segment between the two elements of that combination. Occasional nuisance detections are caused by small animals or blowing debris passing through the electronic wall. Often the location and time required for passage can be used to discriminate against these nuisance detections. The post processor 116 includes logic that determines when a detection has occurred, that it is a probable detection of an intruder, and the probable range to the intruder by evaluating the pattern of beam segments that have been blocked. The post processor then generates a detection report 117 and communicates it to an operator who is usually at a remote location.

The exemplary embodiment of the present invention uses components appropriate for the configuration described herein in keeping with the current state-of-the-art. Pertinent values include for example, an approximate 5 milliwatt DCO output and a receiver noise figure of about 12 dB. The radar has a signal-to-noise ratio of over 20 dB for a plane reflector at approximately 300 meters range coupled to a retroreflector positioned a distance of about 31 meters from the plane reflector. Retroreflectors with the aforesaid internal edge length of 0.185 meters have an effective radar cross section exceeding 60 square meters. This signal-to-noise ratio provides for the generation of the multiple beams making up the electronic wall with an extremely low false alarm rate while making the passage of an intruder through the wall without detection highly improbable. Those skilled in the art will recognize that many alternate radar configurations using other modulation techniques and methods of target detection having equivalent performance will fall within the broad scope of the present invention.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. An apparatus for detection of any intruder passing through a protected volume, comprising:

a first means for generating and modulating electromagnetic wave energy;

a second means coupled to said first means for radiating said electromagnetic wave energy into said protected volume;

a third means co-located with said second means for collecting a portion of said radiated electromagnetic energy;

a fourth means for reflecting, said fourth means capable of redirecting a portion of said electromagnetic wave energy from said second means toward an associated fifth means for reflecting, said fifth means capable of redirecting said electromagnetic wave energy back along a same line of propagation to said fourth means and thus to said third means, thereby forming an electromagnetic beam comprising radiated and reflected electromagnetic wave energy and having two segments, a first segment between said fourth means and said fifth means, and a second segment between said fourth means and said third means;

a plurality of said fourth means and a plurality of said fifth positioned along a base and ends of said protected volume for forming a plurality of said electromagnetic beams, each said electromagnetic beam comprising said first and second segments with a sum of lengths of said first and second segments being unique;

a structure located at a proximal end of said protected volume and coupled to both said second means and said third means capable of supporting said second means and said third means at a position above said base of said protected volume for providing line-of-sight propagation of said electromagnetic beams between said second means and said third means and each of said plurality of said fourth means;

said structure located at said proximal end of said protected volume also capable of being coupled to and supporting another set of said plurality of said fifth means, thereby providing a terminal end of said plurality of said electromagnetic beams at a plurality of heights above said base of said protected volume at said proximal end;

a structure located at a distal end of said protected volume and coupled to and supporting another set of said plurality of said fourth means at a plurality of heights above said base of said protected volume, thereby providing junctions between said first and second segments of said plurality of said electromagnetic beams at said plurality of heights above said base of said protected volume at said distal end;

a signal processing means coupled to said third means and capable of determining a range to objects irradiated by said radiated electromagnetic wave energy, said signal processing means monitors a presence of said electromagnetic beams associated with each said fourth means and associated said fifth means, and for detecting a physical presence of said intruder within said protected volume, and;

an alarm circuit coupled to said signal processing means for generating an alarm when at least one of said electromagnetic beams is interrupted.

2. An apparatus for detection of intruder passing through a protected volume, comprising:

a transmitter for generating and modulating electromagnetic energy;

an antenna coupled to said transmitter for radiating said electromagnetic wave energy into said protected volume;

a receiver coupled to said antenna for receiving a portion of said radiated electromagnetic energy;

a plane reflector capable of redirecting a portion of said radiated electromagnetic wave energy from said antenna toward an associated retroreflector, said retroreflector capable of redirecting said electromagnetic wave energy back along a same line of propagation to said plane reflector and thus to said antenna, thereby forming an electromagnetic beam comprising radiated and reflected electromagnetic wave energy and having two segments, a first segment between said plane reflector and said retroreflector, and a second segment between said plane reflector and said antenna;

a plurality of said plane reflectors and said associated retroreflectors positioned at a plurality of locations along a base and ends of said protected volume capable of forming a plurality of said electromagnetic beams each having said first and second segments, a sum of said first and second segments for each said electromagnetic beam having a unique value;

a sensor structure located at a proximal end of said protected volume and coupled to said antenna for supporting said antenna at a position above said base of said protected volume for providing line-of-sight propagation of said plurality of said electromagnetic beams between said antenna and each of said plane reflectors, said sensor structure also coupled to and supporting another set of said plurality of said retroreflectors, thereby providing a terminal end of said plurality of said electromagnetic beams at a plurality of heights above said base of said protected volume at said proximal end, junctions between said first and second segments of said electromagnetic beams being provided by said plurality of said plane reflectors positioned at said plurality of locations along said base of said protected volume;

a reflector structure located at a distal end of said protected volume and coupled to another set of said plurality of plane reflectors for supporting said plane reflectors at a plurality of heights above said base of said protected volume, thereby providing said junctions between said segments of said plurality of said electromagnetic beams at said plurality of heights above said base of said protected volume at said distal end, said terminal end of said electromagnetic beams being provided by said plurality of said retroreflectors positioned at said plurality of locations along said base of said protected volume;

a signal processing circuit coupled to said receiver and capable of determining a range to objects irradiated by said radiated electromagnetic wave energy, said signal processing circuit monitors a presence of said plurality of said electromagnetic beams formed by each said plane reflector and said associated retroreflector for detecting a physical presence of said intruder within said protected volume, and;

an alarm circuit coupled to said signal processing circuit for generation of an alarm when at least one of said electromagnetic beams is partially or completely interrupted.

3. An apparatus as claimed in claim 2, wherein said transmitter generates said electromagnetic wave energy in a millimeter-wave region of an electromagnetic spectrum;

and said receiver receives energy in said millimeter-wave region of said electromagnetic spectrum.

4. An apparatus as claimed in claim 2, wherein said antenna comprises means for radiating said electromagnetic wave energy into said protected volume and minimizing radiation outside said protected volume.

5. An apparatus as claimed in claim 2, wherein said plurality of said plane reflectors positioned at said plurality of locations along said base of said protected volume and coupled to said reflector structure at said plurality of heights above said base of said protected volume comprise reflectors capable of redirecting substantially all incident electromagnetic wave energy from said antenna toward locations of said associated retroreflectors.

6. An apparatus as claimed in claim 2, wherein said plurality of said retroreflectors positioned at said plurality of locations along said base of said protected volume and coupled to said sensor structure at said plurality of heights above said base of said protected volume comprise retroreflectors capable of returning substantially all incident electromagnetic wave energy along a path opposite in direction but parallel to a path of said incident electromagnetic wave energy.

7. An apparatus as claimed in claim 2, wherein each said electromagnetic beam comprises a substantial portion of said electromagnetic wave energy incident upon said plane reflector and returned by said retroreflector, and said signal processing circuit and said alarm circuit responsive to high signal-to-noise ratio energy in said electromagnetic beams to provide high probability of detection of said intruder while providing low probability of false alarm.

8. An apparatus as claimed in claim 2, wherein said antenna is located at a position sufficiently high above said base of said protected volume, and wherein said plurality of said plane reflectors are located at positions along said base of said protected volume and a portion of said plurality of said plane reflectors are positioned in a vertical arrangement on said reflector structure, and wherein said plurality of said retroreflectors are located at positions along said base of said protected volume and a portion of said plurality of said retroreflectors are positioned in a vertical arrangement on said sensor structure to generate a sufficient number of said electromagnetic beams with beam-to-beam spacing sufficiently small and upper beam height sufficiently high to preclude said intruder passing through said volume without detection.

9. A method of detecting an unauthorized intrusion, comprising: generating and modulating electromagnetic wave energy;

radiating said electromagnetic wave energy into a plurality of sections along a protected region;

redirecting a portion of said radiated electromagnetic wave energy from at least one of said sections to another section of said protected region;

reflecting said redirected electromagnetic wave energy from said another section back along a same line of propagation to said at least one of said sections from which said electromagnetic wave energy was redirected, collecting said reflected electromagnetic wave energy from said at least one of said sections, thereby providing a terminal end for said portion of said electromagnetic wave energy; and indicating an occurrence of an unauthorized intrusion upon interruption of said electromagnetic wave energy along any line of propagation.

* * * * *